Figure 1:
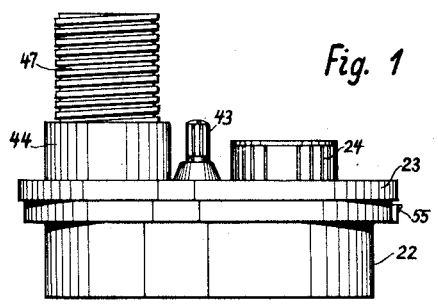

Oct. 27, 1953

K. WIEBALCK 2,656,773

PHOTOGRAPHIC DEVELOPING APPARATUS

Filed Feb. 28, 1950

5 Sheets-Sheet 1

INVENTOR
KLAUS WIEBALCK

Oct. 27, 1953 K. WIEBALCK 2,656,773
PHOTOGRAPHIC DEVELOPING APPARATUS
Filed Feb. 28, 1950 5 Sheets-Sheet 2
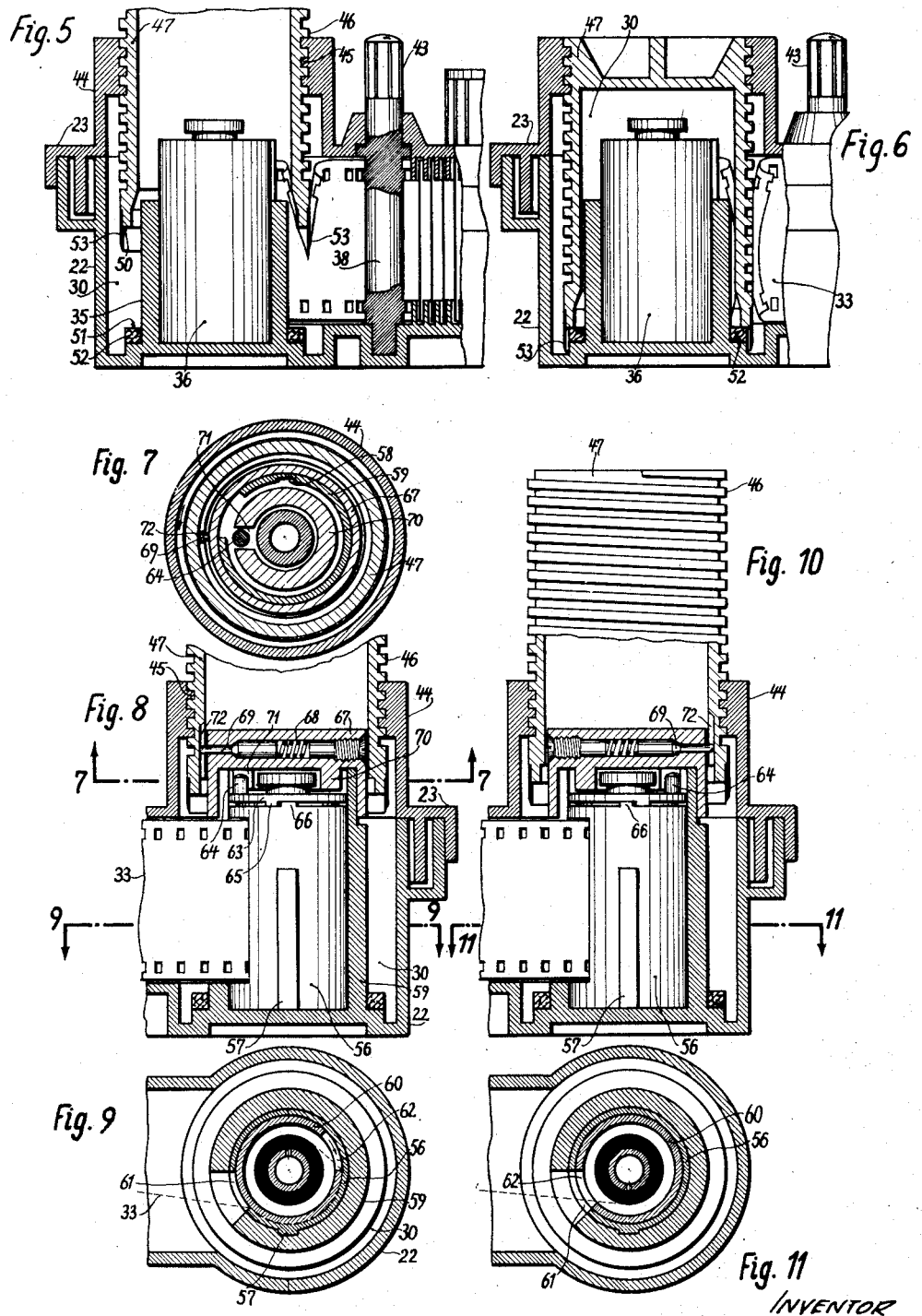
INVENTOR
KLAUS WIEBALCK Oct. 27, 1953     K. WIEBALCK     2,656,773
PHOTOGRAPHIC DEVELOPING APPARATUS Filed Feb. 28, 1950     5 Sheets-Sheet 3

INVENTORS
KLAUS WIEBALCK

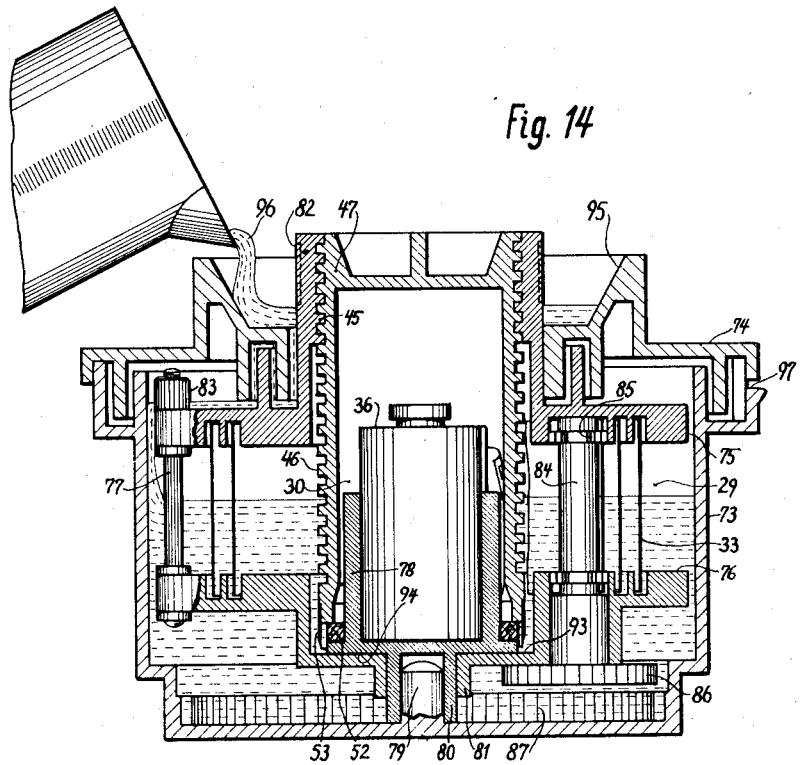
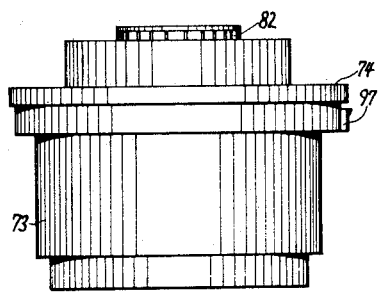
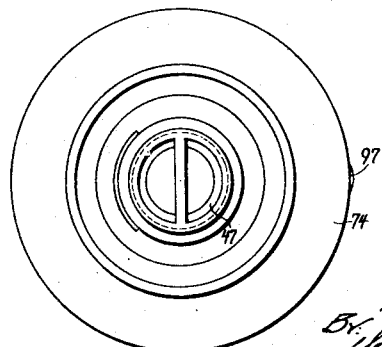

Oct. 27, 1953 K. WIEBALCK 2,656,773
PHOTOGRAPHIC DEVELOPING APPARATUS
Filed Feb. 28, 1950 5 Sheets-Sheet 5
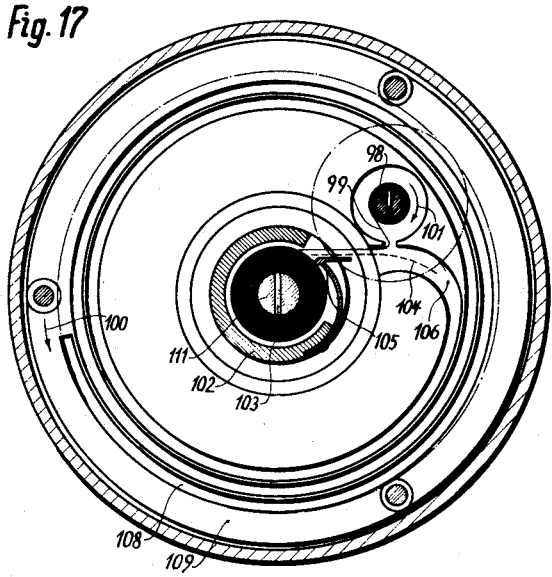
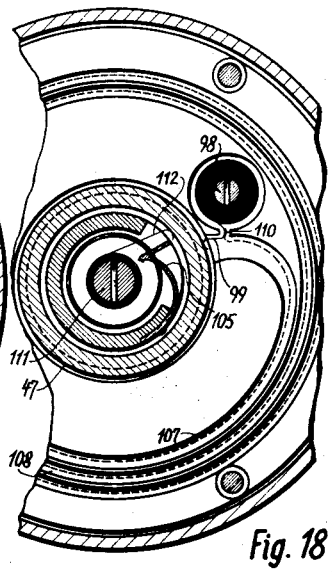
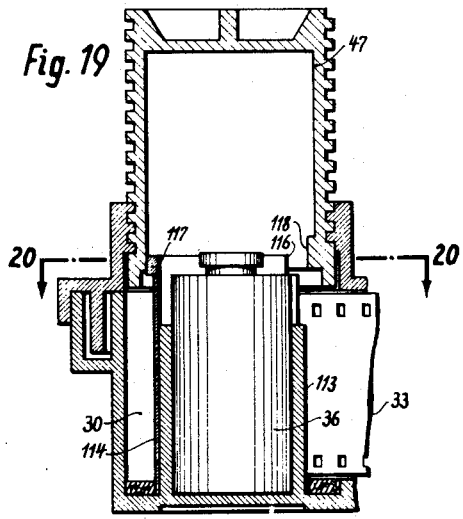
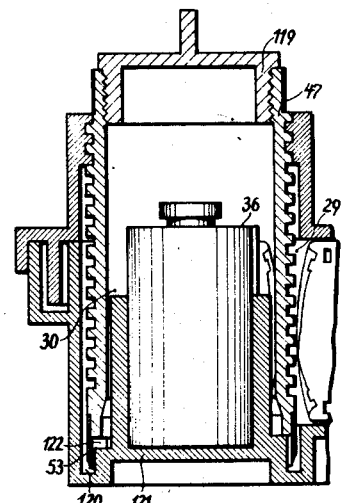
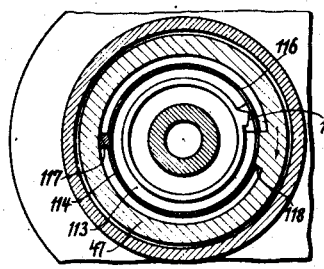
INVENTORS
KLAUS WIEBALCK Patented Oct. 27, 1953

2,656,773

UNITED STATES PATENT OFFICE 2,656,773

PHOTOGRAPHIC DEVELOPING APPARATUS

Klaus Wiebalck, Munich, Germany

Application February 28, 1950, Serial No. 146,855
In Germany October 28, 1949

5 Claims. (Cl. 95—90.5)

This invention relates to a photographic developing apparatus and has particular reference to a developing apparatus for photographic strips of any desired material, more particularly, film strips provided with a sensitized layer, which permits daylight developing and is known as a "daylight loading developing tank."

The developing tank or apparatus comprises a developing compartment which can be closed lighttightly and includes a holding device for the carrier or film strip to be developed, which is hereinafter briefly referred to as the "strip," and a feed compartment including a holding device for the spool or reel carrying the strip, as well as means for feeding the length of strip to be developed from the feed compartment to the developing compartment. The feed compartment in this case may be arranged either side by side with the developing compartment or concentrically in the middle of the developing compartment. More particularly the present invention relates to a developing apparatus of the kind referred to in which the strip length to be developed and fed into the developing compartment is severed from the rest of the strip remaining on the spool and not being intended for the treatment with developer fluid, and lighttightly, preferably fluid-tightly separated therefrom.

It is the object of the invention to provide simple and reliable means for tightening the feed compartment against the developing compartment and preferably for simultaneously cutting off the strip length to be developed.

Another object of the invention is to improve and simplify the handling and the construction of the apparatus.

With these and further objects in view, which will hereinafter appear, the developing apparatus according to the present invention comprises a feed compartment cooperating with a hollow, cup-shaped packing sleeve which can be introduced into the feed compartment from outside through a lighttight guide bearing, thereby enclosing the reel or spool with the rest of the strip or only the empty spool; the sleeve in its outer or initial position releases the path for conveying the strip to be developed from the feed compartment into the developing compartment, while in its inner or end position the feed compartment containing the spool is closed lighttightly, preferably fluid-tightly, with respect to the developing compartment by cooperating packing means provided on the packing sleeve and in the feed compartment.

Preferably the lighttight guide bearing of the packing sleeve consists of a threaded part by means of which the packing sleeve can be screwed into the feed compartment. This threaded part has the advantage that a lighttight labyrinth packing is formed by the screw threads and that a strong force is produced for tightly pressing the packing surface of the sleeve against the packing surface of the feed compartment as it is screwed in. Moreover, this screw-threaded packing sleeve and the casing of the apparatus which is provided with a corresponding female thread can be easily operated, taken to pieces and cleaned, and the manufacture of these parts, for instance, of synthetic material, is simple and cheap.

According to a particularly favorable modification of the invention the developing apparatus is combined with a cutting device for severing the strip length introduced into the developing compartment from the rest of the strip remaining in the developing compartment. To this end the packing sleeve, which is preferably screw-threaded, is provided with a cutting edge which is passed through the strip in the rotary screwing motion of the packing sleeve and cuts off the strip. This cutting edge is advantageously provided at the open lower rim of the packing sleeve in the form of a ring knife. Thus a reliable severing of the strip is effected during the screwing-in of the packing sleeve.

The application of the apparatus is not restricted to perforated film strips, but it is also suitable for any other sensitized carrier strips of paper or other material. Also it is possible to use special film cassettes or cartridges, e. g. double-walled film cassettes in combination with special auxiliary devices.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2:
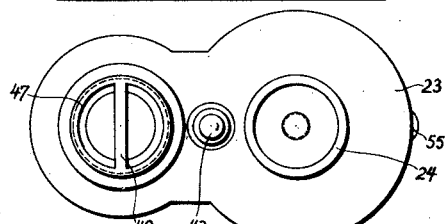
Figure 3:
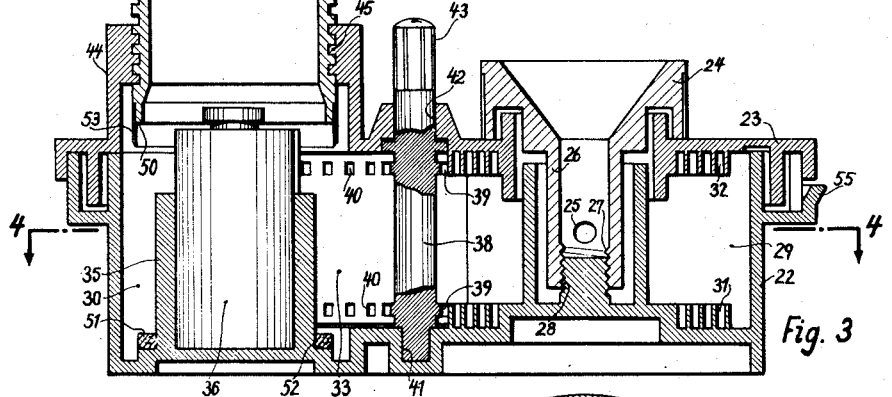
Figure 4:
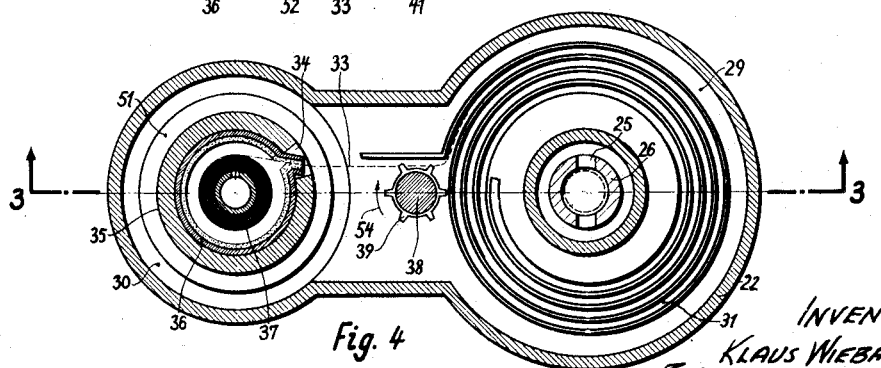

Fig. 1 is a side view, on a reduced scale, of a developing apparatus having a feed compartment arranged laterally of the developing compartment, Fig. 2 is a plan view of the apparatus of Fig. 1, Fig. 3 is a vertical section, on the line 3—3 of Fig. 4 through the apparatus shown in Figs. 1 and 2, with the packing sleeve in its initial position, Fig. 4 is a horizontal section on line 4—4 of Fig. 3, Fig. 5 is a fragmentary vertical section of the apparatus according to Fig. 3, with the packing sleeve partly screwed in, Fig. 6 is a fragmentary vertical section of the apparatus according to Fig. 3, with the packing sleeve in its screwed-in end position.

Figure 12:
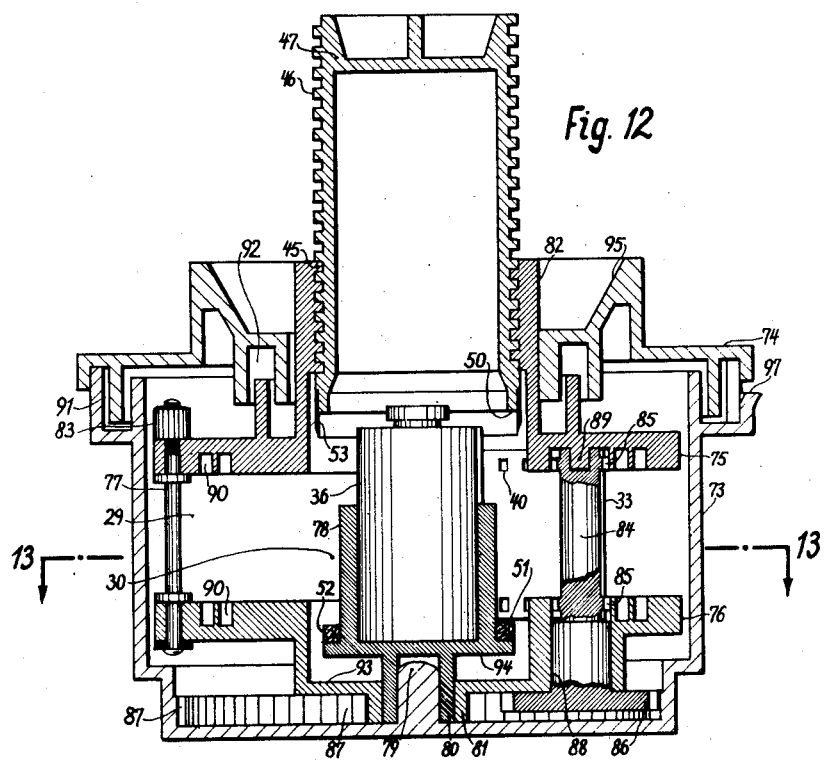
Figure 13:
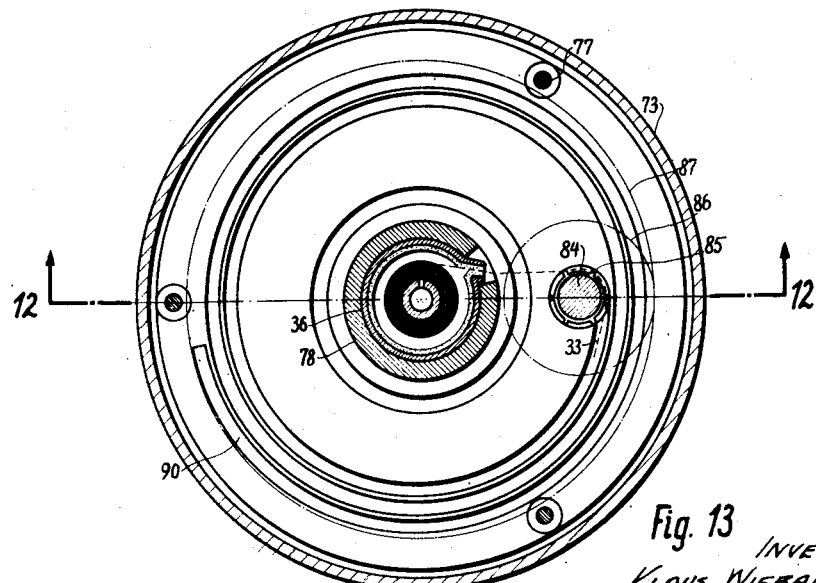

Fig. 7 is a fragmentary horizontal section through an apparatus with special film cassette on the line 7—7 of Fig. 8, viewed from below, Fig. 8 is a fragmentary vertical section through the feed compartment of the device of Fig. 7, Fig. 9 is a horizontal section on the line 9—9 of Fig. 8, viewed from the top, Fig. 10 is a fragmentary vertical section according to Fig. 8 with the special film cassette shown in open condition, Fig. 11 is a horizontal section on the line 11—11 of Fig. 10, Fig. 12 is a vertical section on the line 12—12 of Fig. 13 through a developing apparatus having a feed compartment arranged concentrically to the developing compartment, Fig. 13 is a horizontal section on the line 13—13 of Fig. 12, Fig. 14 is a vertical section of the apparatus according to Fig. 12 with screwed-in packing sleeve, Fig. 15 is a side view of the device according to Figs. 12 to 14, shown on a reduced scale, Fig. 16 is a top view of the apparatus according to Fig. 15, Fig. 17 is a horizontal section through a device according to Figs. 12 to 16, but including a device for non-perforated film with protective paper wrapping, Fig. 18 is a fragmentary horizontal section of the apparatus according to Fig. 17 with wound-off film and screw-in packing sleeve, Fig. 19 is a fragmentary vertical section through the feed compartment of an apparatus with modified cutting device, Fig. 20 is a horizontal section on the line 20—20 of Fig. 19, and Fig. 21 is a fragmentary vertical section of an apparatus with lighttight packing of the feed compartment with respect to the developing compartment.

Similar reference numerals denote similar parts in the different figures.

Referring now to the drawings in greater detail, and first to Figs. 1 to 6, it will be seen that the apparatus which serves, for instance, for the developing of perforated standard size cinema film, comprises a casing or tank 22 with a cover 23. With the aid of a screw funnel 24, whose neck part 26 is provided with transverse bores 25 and an internal thread 27, the cover 23 can be tightly screwed on a thread 28 provided on the bottom of the casing 22 for connection with the casing 22 in such a manner that it can not be lifted off.

The casing 22 with its cover 23 comprises on the one hand a developing compartment 29 and on the other hand a feed compartment 30, which compartments communicate with each other. The developing compartment 29 has spiral grooves 31 provided in the bottom of the casing and corresponding spiral grooves 32 provided in the surface 23, which spiral grooves co-operate to guide the film strip 33 to be developed. In the feed compartment 30 is accommodated a tubular support 35 for the film cassette formed with a lateral slit 34, for insertion of the film cassette 36 of the film spool 37. A rotary feed spindle 38, whose sprockets 39 are adapted to engage the perforations 40 of the film strip 33 serves to feed the film strip 33. The feed spindle 38 is supported in a bearing 41 in the bottom of the casing and in a bearing 42 in the cover 23 and bears an outwardly projecting knurled knob or handle 43.

Above the feed compartment 30 the cover 23 has a tubular extension 44 including a female thread 45 in which is threadably engaged a hollow cup-shaped packing sleeve 47 provided at its superficies with a male thread 46, the female thread 45 having several thread fillets in order to ensure a lighttight closure. The internal width of the cup-shaped packing sleeve 47 is dimensioned so that the sleeve fits over the support 35 for the film cassette in the feed compartment. The bottom 48 of the packing sleeve 47 is provided with a handle 49.

At its lower open rim the packing sleeve 47 is formed with an annular packing surface 50 which co-operates with a packing surface 51 of a packing ring 52 arranged at the bottom of the casing, around the cassette support 35. Moreover, an annular knife edge 53 is secured on the lower part of the superficies of the packing sleeve 47, which knife edge projects from the packing surface 50 and is dimensioned in such a way that it is also adapted to fit over the packing ring 52.

The apparatus hereinbefore described operates as follows: The cover 23 is removed in order to develop a film strip. The film cassette 36 is fitted into the cassette support 35 of the feed compartment 30. Now the free end of the film strip 33 is drawn off from the film spool 37 through the slit 34, its perforations 40 are engaged with the sprockets 39 of the feed spindle 38 and threaded a little into the outermost turn of the spiral groove 31. The cover 23 is placed on the casing 22 with the packing sleeve 47 screwed to its upper position, whereby the forward end of the film strip 33 comes to lie also in the upper spiral groove 32. With the aid of the screw funnel 24 the cover 23 is fixedly secured on casing 22, as shown in Fig. 3.

By turning the feed spindle 38 in the direction of arrow 54 the film spool 37 is now wound off and the part of the film strip 33 to be developed is introduced into the spiral grooves 31, 32 of the developing compartment 29. The packing sleeve 47 is now screwed into the feed compartment 30 by clockwise turning of handle 49, whereby the knife edge 53 cuts through the film strip 33, as shown in Fig. 5 and severs the length of film strip 33 in the developing compartment 29 from the strip length remaining in the film holder 36 in a wound-up condition. In the lower end position of the packing sleeve 47 as indicated in Fig. 6 the film strip is entirely cut through, and the lower packing surface 50 of the packing sleeve engages the counter-packing surface 51 of packing ring 52. The required contact pressure can easily be attained by the force exerted by screwing the packing sleeve 47. Now the feed compartment 30 is fluid-tightly separated from the developing compartment 29 and developing liquid can be poured into the developing compartment 29 through the screw funnel 24 and the cross bores 25 thereof without permitting the liquid to enter the feed compartment 30.

On termination of the developing process the liquid can be poured out again through a discharge 55. Now the cover 23 can be taken off and the developed film strip can be removed from the developing compartment 29.

It is also possible to provide the developing apparatus for use in connection with special film cassettes having a mouth which can be closed, e. g. special film cassettes of the type opening automatically as the camera is closed and closing automatically as the camera is opened, after the manner of the well-known double-walled film cassettes. The device shown in Figs. 7 to 11 for opening the mouth of the film cassette within the dark feed compartment relates to a film cassette with double wall. It will be understood that similar devices can be designed for other special film cassettes. According to the invention the opening and closing of the special film cassette is effected by turning the packing sleeve, the latter being provided with an uneven surface for exerting a driving effect, for instance, upon an intermediate driving member.

The double-walled film cassette consists, for instance, of an outer shell 56 having a rib 57 adapted to fit in a vertical groove 58 of the slotted magazine support 59, and an inner shell 60 adapted to be turned with respect to the outer shell 56. The outer shell 56 comprises a window 61 while the inner wall 60 comprises a window 62, which windows are relatively displaced about 180° when the double-wall film cassette is closed. The Figs. 7 to 9 show the double-walled film cassette in closed condition while Figs. 10 and 11 show the film cassette in its open condition, with coinciding windows 61, 62. The cover 63 of the double-walled film cassette is fixedly connected with the inner wall or shell 60 and provided with a pin 64. It can be turned through 180°; further turning is prevented, however, by strips 65, 66.

The double-walled film cassette 56, 60 is introduced into the magazine support 59 and the projecting free length of the film strip 33 is engaged with the sprockets of feed spindle 38 and with the spiral groove 31 of the developing compartment 29. All these parts are designed in accordance with the Figs. 1 to 6.

Now a special driving device 67 in the form of a cover is put on the cassette support 59; a pressure pin 69 projects from the side wall of the driving device 67, and is loaded by a compression spring 68, while a recessed rim or collar 70 is arranged at the inner side of the driving device, in whose recess 71 fits the pin 64 of the cover of the film cassette 63.

Now the packing sleeve 47 which in this case is provided with left hand thread 46 is screwed into the female thread 45 of the extension 44 of the cover and screwed upwards up to its extreme end position. The packing sleeve is then screwed back one turn in such a manner that when putting the cover 23 on the casing 22 the press pin 69 engages in a groove 72 within the packing sleeve 47. On fixing of the cover 23 on the casing 22 the packing sleeve 47 is turned to the right through one half turn, whereby the double-walled film cassette is opened through pin 64 and cover 63.

When hereafter the film strip 33 has been conveyed from the feed compartment 30 into the developing compartment 29, the threaded packing sleeve 47 is turned to the left one half turn, whereby the inner wall 60 of the film cassette is turned via the driving device 67 and the film cassette is closed again. On further rotation of the threaded packing sleeve 47 the press pin 69 is lifted out of the groove 72 against action of the spring 68. The severing of the film strip 33 and the packing of the double-walled cassette 56, 60 against the developing liquid is then effected by means of the threaded packing sleeve 47 in the same manner as in the embodiment according to Figs. 1 to 6.

In the modification according to Figs. 12 to 16, the feed compartment 30 is arranged in the center of the preferably annular developing compartment 29. In an open condition (Fig. 12) the feed compartment 30 passes over directly into the surrounding developing compartment 29, while in its closed state (Fig. 14) the feed compartment is closed absolutely tightly against the developing compartment 29 by a cup-shaped packing sleeve 47. Here again the outer circumference of the packing sleeve 47 is provided with a male thread 46 engaging in a female thread 45 arranged above the feed compartment 30 and forming a light-tight closure together with the female thread 45.

Moreover, here again a cutting device is provided which is preferably coupled with the packing sleeve 47 and advantageously consists, similar as in Figs. 1 to 6, of a knife edge 53 of annular shape secured to the lower open rim of the packing sleeve 47. Furthermore a packing surface 50 is again arranged at the lower open rim of the packing sleeve 47 within the knife 53, which packing surface is adapted to engage a packing surface 51 provided at the bottom of the feed compartment 30, in the screwed-in position of the packing sleeve 47, as shown in Fig. 14. For instance, the packing surface 51 may be formed by a packing ring 52 which may be embraced by the annular knife 53.

While the above mentioned parts of this concentric form of apparatus are designed in accordance with the embodiment shown in Figs. 1 to 6 and operate accordingly, the developing apparatus according to Figs. 12 to 16 consists for the rest of a round casing or tank 73, a cover 74 and a film strip holding device 75, 76, whose upper spirally grooved disk 75 can be connected to the lower spirally grooved disk 76 by three anchor screws 77.

In order to develop a firm strip, the apparatus is taken to pieces and the film cassette 36, for instance a standard size film cassette, is fitted into a cassette insert 78 rotatably mounted on a journal 79, on the bottom of the casing 73. The cassette insert 78 bears the packing ring 52, and has at its lower side a hollow journal or pivot 80, on which the lower spirally grooved disk 76 is mounted by means of its central hub 81 for axial sliding. The upper spirally grooved disk 75 bears in its upper neck 82 a female thread 45 into which the packing sleeve 47 is now threaded from below by means of its male thread 46. The spirally grooved disk 75 is then put on the anchor screws 77 and screwed to the lower spirally grooved disk 76 by means of small knurled nuts 83. A film driving roller 84 having small sprockets 85 for engagement in the perforations 40 of the film strip 33 and a large toothed wheel 86 meshing with a toothed rim 87 arranged on the bottom of the casing 73, is put from below through a bore 88 of the lower spirally grooved disk 76 and supported at its top end in a journal 89 of the upper spirally grooved disk 75, so that the film driving roller 84 can rotate in the bearings 88, 89. Now the free end of the film strip 33 is drawn out of the cartridge 36, its perforation 40 is engaged in the sprocket wheels 85 of the film driving roller 84 and threaded into the beginning of the spiral grooves 90 of the two disks 75, 76 of the film holding device. This position of the film strip 33 is indicated in Fig. 13 by dotted lines.

Now the film holding device 75, 76 including the cassette insert 78, cassette 36, the threaded packing sleeve 47 and the film driving roller 84 is inserted in the casing or tank 73 and the latter is closed lighttightly by the cover 74. This condition is illustrated in Figs. 12 and 13. A labyrinth-type light lock 91 at the outer periphery of casing 73 and cover 74 and corresponding light locks 92 at the inner periphery of the cover 74 or at the upper spirally grooved disk 75, respectively, prevent the access of light into the developing compartment 29 and the feed compartment 30, but are dimensioned in such a way that fluid can pass through the channels of the light locks.

By rotating the neck 82 of the upper spirally grooved disk 75 in an anti-clockwise direction, the toothed wheel 86 rolls off on the internal toothing 87. Thus the film driving roller 84 is rotated and the film strip 33 to be developed is drawn from the magazine 36 into the spiral grooves 96. As soon as this operation is completed, the threaded packing sleeve 47 is screwed into the feed compartment 30 whereby the knife edge 53 severs the film strip 33. Finally the packing surface 50 of the threaded sleeve 47 strikes against the packing surface 51 of the packing rim 52. On further rotation of the packing sleeve 47 the film holding device 75, 76 is screwed upwards, until the bottom surface 93 of the spirally grooved disk 76 strikes against the bottom 94 of the cassette insert 78. By the stroke of the film holding device 75, 76 the toothed wheel 86 of the film driving roller 84 disengages the internal toothing 87, and the film holding device 75, 76 can be freely turned from outside by means of the neck 82. This condition is shown in Figure 14. Now the developing fluid 96 can be poured into the developing compartment 29 through the funnel 95 and the film strip 33 can be developed, the developing liquid being prevented from entering into the feed compartment 30 by the threaded packing sleeve 47. Later on the developing liquid can again be poured out through a discharge 97. Finally the developing apparatus is taken to pieces, the developed film strip 33 is lifted out of the spiral grooves 96 and the cassette 36 which has remained absolutely dry is removed from the cassette insert 78.

The embodiment according to Figs. 17 and 18 illustrates the application of an apparatus according to Figs. 12 to 16 for non-perforated film with a protective paper wrapping. It is sufficient to show the horizontal section since the rest of the parts are substantially in accordance with the embodiment according to Figs. 12 to 16. Accordingly the arrangement can also be used in the apparatus according to Figs. 1 to 6.

In this case instead of the film driving sprockets a paper take-up spool 98 is provided on which the free end of the protective paper strip 99 is secured. By turning the film holding device in the direction of the arrow 100, the paper take-up spool 98 is imparted a rotary motion in the direction of arrow 101. The spool 103 inserted in a spool insert 102, on which spool the protective paper and the film strip are wound up together, is wound off to such an extent that the film end 104 is stripped off from the spool 103 by an elastic stripper 105 and threaded into the beginning 106 of the innermost spiral groove turn. By further rotation of the strip holding device the whole film strip 107 is moved into the spiral grooves 108 of the lower spiral groove disk 109 or of the upper spiral groove disk, respectively, which is not shown in this figure, until the adhesive fastening 110 comes to lie in front of the paper take-up spool 98 between the protective paper 99 and the film strip 107, so that said spool 98 is locked against further turning. The resistance thereby caused against turning of the film holding device indicates that the loading of the developing compartment with the film strip 107 to be developed is finished. The threaded sleeve 47 is now screwed down and severs the protective paper strip 99 wound up on the paper take-up spool 98 from the remaining part 112 which is left on the spool core 111.

The embodiment according to Figs. 19 and 20 shows that it is also possible to use a separate cutting device instead of a knife edge 53 secured to the packing sleeve 47 according to Figs. 1 to 16. The embodiment relates to a developing apparatus according to Figs. 1 to 6. But it is also possible to use an apparatus according to Figs. 12 to 16 or the like.

According to Figs. 19 and 20 a cutting device 114 in the form of a thin slotted tube is put over a cassette insert 113. As the film reel accommodated in the cassette 36 is wound off and the film strip 33 is passed into the spiral grooves of the strip holding device, the film strip 33 can freely pass through the slit 115 of the cutting device 114. The edge 116 of the cutting device 114 is sharpened. Moreover a nose 117 is provided on the cutting device 114 while a projection 118 is provided on the inner side of the threaded sleeve 47. Now, as the threaded sleeve 47 is screwed into the feed compartment 30 the projection 118 operates the nose 117 of the cutting device 114 whose edge 116 severs the film strip 33 at once.

It will be understood that the arrangement shown in Figs. 19 and 20 if desired can also be used without the cutting device 114. This is possible where it is intended to develop a film which is not fixedly connected with the core of the film spool and therefore need not be cut off. Or it is also possible, within the purview of the invention, to use a cutting device which is entirely independent of the threaded sleeve 47. In this case the arrangement according to Figs. 19 and 20 could also be used, but omitting the cutting device 114.

The embodiment according to Fig. 21 shows that it is also possible to use a lighttight packing instead of a fluid-tight packing between the feed compartment 30 and the developing compartment 29, in case the cassette or the film reel can be taken out of the feed compartment 30 before the developing fluid is poured in. In this case the threaded sleeve 47 has a fixed bottom instead of a screwed-in threaded cover 119. After the threaded sleeve 47 has been screwed into the feed compartment 30, this screw cover 119 is screwed out and the cassette 36 can be removed from the compartment 30. The annular knife edge 53 fixed to the lower open end of the packing sleeve 47 projects into an annular groove 120 of the bottom 121 and forms a lighttight labyrinth. In this case the fluid can enter from the feed compartment 30 into the developing compartment 29 through a recess 122 in the bottom 121 so that the developing fluid instead of being poured in through a funnel as per Fig. 3, can be poured in through the open upper end of the threaded sleeve 47.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a photographic developing apparatus for sensitized strips, an outer casing including a cover making up together a feed compartment adapted to accommodate a strip carrier and a developing compartment arranged concentrically around the feed compartment, an upper strip holding member having a spiral groove, a lower strip holding member having a spiral groove registering with the spiral groove of the upper strip holding member, means for interconnecting said strip holding member to form a rigid unit, means permitting rotation and axial sliding of said strip holding unit in said casing and cover, a neck part on the upper strip holding member projecting to the outside through said cover to permit manual handling and formed with a female thread, a tightening sleeve in the form of a hollow cup having a male thread on its outer superficies engaging said female thread, for lighttightly introducing said tightening sleeve into the feed compartment, thereby lighttightly enclosing the strip carrier, a strip driving roller rotatably mounted in the strip holding unit, a gear wheel at the lower end of the driving roller, and a toothed rim provided in said casing, said gear wheel being adapted to be brought into or out of meshing engagement with said toothed rim by axial sliding of said strip holding unit in said casing, whereby said driving roller can be rotated as the strip holding unit is turned, and tightening surfaces on said tightening sleeve and on the part of the casing engaged by said sleeve tightening surface, for lighttightly separating the feed compartment from the developing compartment in the lower end position of the sleeve, said threaded tightening sleeve being adapted after engagement of the tightening surface of the sleeve with the counter-tightening surface of the casing, by its further rotation, to cause upward screwing of the female thread of the strip holding unit on the male thread of the threaded sleeve, for moving the gear wheel out of meshing engagement with said toothed rim.

2. A photographic developing apparatus for sensitized strips comprising a tank with a developing chamber and a loading chamber and receiving means in the latter chamber for the wound-up strip, means forming a passage for the unwinding of the strip from said strip-receiving means into said developing chamber, a strip-receiving reel disposed in said developing chamber and having an upper and a lower flange, said loading chamber being arranged in the center of said lower flange, means for closing said passage including a female thread provided in the center of said upper flange and a sleeve rotatable externally of said tank, said sleeve having its cavity facing towards said loading chamber and having a male thread provided on its side walls for engaging with said female thread, said side walls being adapted to be screwed into said loading chamber when said sleeve is turned externally thereby closing said passage.

3. A photographic developing apparatus for sensitized strips comprising a tank with a developing chamber and a loading chamber and receiving means in the latter chamber for the wound-up strip, means forming a passage for the unwinding of the strip from said strip-receiving means into said developing chamber, a strip-receiving reel rotatably disposed in said developing chamber and having an upper and a lower flange, said loading chamber being arranged in the center of said lower flange, means for unwinding the strip through said passage including a transmission automatically operative when said strip-receiving reel is turned, means for closing said passage including a female thread provided in the center of said upper flange and a sleeve rotatable externally of said tank, said sleeve having its cavity facing towards said loading chamber and having a male thread provided on its side walls for engaging with said female thread, said side walls being adapted to be screwed into said loading chamber when said sleeve is turned externally thereby closing said passage.

4. A photographic developing apparatus for sensitized strips comprising a tank with a developing chamber and a loading chamber and receiving means in the latter chamber for the wound-up strip, means forming a passage for the unwinding of the strip from said strip-receiving means into said developing chamber, a strip-receiving reel rotatably and liftably disposed in said developing chamber and having an upper and a lower flange, said loading chamber being arranged in the center of said lower flange, means for unwinding the strip through said passage including a transmission automatically operative when said strip-receiving reel is turned in unlifted position and idling when said strip-receiving reel is turned in lifted position, means for lifting said strip-receiving reel including a reel-lifter element and a female thread provided in the center of said upper flange and a sleeve rotatable externally of said tank, said reel-lifter element being disposed in said loading chamber for axial movement therein and having force-transmitting connection to the bottom of the tank through an opening in said lower flange, said sleeve having its cavity facing towards said loading chamber and having a male thread provided on its side walls for engaging with said female thread and being adapted to be screwed into said loading chamber when turned externally and to press in its screwed-in end position its walls against said reel-lifter element thereby forcing said female thread and in consequence said strip-receiving reel to move upwardly due to the force-transmitting connection to said reel-lifter element to the bottom of the tank.

5. A photographic developing apparatus of the class described in claim 1, said reel-lifter element and said receiving means for the wound-up strip being united to a single element disposed in said loading chamber for axial movement therein.

KLAUS WIEBALCK.

References Cited in the file of this patent

UNITED STATES PATENTS

| Number | Name | Date |
|---|---|---|
| 2,076,070 | Dazey | Apr. 6, 1937 |
| 2,290,152 | Andrews et al. | July 21, 1942 |

FOREIGN PATENTS

| Number | Country | Date |
|---|---|---|
| 877,777 | France | Sept. 14, 1942 |
| 657,012 | Germany | Feb. 23, 1938 |
| 724,969 | Germany | Sept. 10, 1942 |